USO09477534B2

(12) United States Patent
Perry et al.

(10) Patent No.: US 9,477,534 B2
(45) Date of Patent: Oct. 25, 2016

(54) INTER-EXTENSION MESSAGING

(75) Inventors: Matthew Perry, San Francisco, CA (US); Aaron Boodman, San Francisco, CA (US); Erik Kay, Belmont, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/110,893

(22) Filed: May 18, 2011

(65) Prior Publication Data
US 2015/0207817 A1 Jul. 23, 2015

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
| | |
|---|---|
| H04L 29/06 | (2006.01) |
| H04L 12/58 | (2006.01) |
| G06F 9/54 | (2006.01) |
| G06F 21/53 | (2013.01) |
| G06F 21/57 | (2013.01) |
| G06F 17/30 | (2006.01) |
| G06F 9/445 | (2006.01) |
| G06F 3/0484 | (2013.01) |
| G06F 11/07 | (2006.01) |
| H04L 29/08 | (2006.01) |

(52) U.S. Cl.
CPC ............ *G06F 9/54* (2013.01); *G06F 3/04842* (2013.01); *G06F 8/61* (2013.01); *G06F 8/62* (2013.01); *G06F 11/0766* (2013.01); *G06F 17/3089* (2013.01); *G06F 17/30861* (2013.01); *G06F 21/53* (2013.01); *G06F 21/57* (2013.01); *H04L 51/12* (2013.01); *H04L 63/0823* (2013.01); *H04L 63/1483* (2013.01); *H04L 67/10* (2013.01); *H04L 67/289* (2013.01); *H04L 67/2842* (2013.01); *H04L 67/42* (2013.01); *H04L 67/02* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 8,104,044 | B1 * | 1/2012 | Scofield et al. | 719/313 |
| 8,683,052 | B1 * | 3/2014 | Brinskelle | H04L 63/126 709/228 |
| 2004/0034860 | A1 * | 2/2004 | Fernando et al. | 719/315 |
| 2004/0107250 | A1 * | 6/2004 | Marciano | 709/204 |
| 2005/0021280 | A1 * | 1/2005 | Woods et al. | 702/142 |
| 2006/0047968 | A1 * | 3/2006 | Nakagawa | G06F 21/55 713/176 |
| 2007/0101291 | A1 * | 5/2007 | Forstall et al. | 715/805 |
| 2007/0130541 | A1 * | 6/2007 | Louch et al. | 715/804 |
| 2007/0277109 | A1 * | 11/2007 | Chen et al. | 715/733 |
| 2010/0010930 | A1 * | 1/2010 | Allen | G06Q 30/04 705/38 |
| 2010/0162275 | A1 * | 6/2010 | Bradley et al. | 719/328 |
| 2010/0242110 | A1 * | 9/2010 | Louch et al. | 726/22 |

\* cited by examiner

*Primary Examiner* — Umut Onat
(74) *Attorney, Agent, or Firm* — Brake Hughes Bellermann LLP

(57) ABSTRACT

According to one general aspect, a computer-implemented method may include implementing, in a web browser executing on a computing device, a first extension process. The first extension process may be functionally isolated from a second extension process that is implemented in the web browser. The method may also include presenting, by the first extension process, a public messaging interface. The method may further include receiving, by the first extension process via the public messaging interface, a messaging request from the second extension process, the messaging request including a unique extension ID of the second extension process. The method may also include determining, by the public messaging interface, whether to accept or reject the messaging request based on the first unique extension ID.

12 Claims, 7 Drawing Sheets

INTER-EXTENSION MESSAGING

CROSS REFERENCE TO RELATED APPLICATIONS

This application claims the benefit, under 35 U.S.C. §119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these provisional patent applications are incorporated herein by reference in their entirety.

TECHNICAL FIELD

This application relates, in general, to message passing between browser extensions.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, smartphones and cell phones, among a number of other possible devices. Such web browsers are configured to read programmatic code and render that code as web pages, which may include rendering both audio and visual content contained in various media files (e.g., image, video and audio files), as well as performing other functions defined in the programmatic code. Web pages are generally implemented using standard programming languages such as HTML, HTML5, CSS and JAVASCRIPT, among a number of other available programming languages.

Some browsers allow users to install add-ons (or extensions) to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information.

Browser extensions are generally implemented using programmatic code that is written using the same programming languages that are used for implementing web pages. From a browser's perspective, extensions effectively function as web pages that are an integrated part of the browser once they are installed. By installing extensions that are of interest to him or her, a user can effectively create a custom browser that includes the functionality of the extensions they choose to install.

In certain embodiments, extensions installed in a browser run in an "open environment" where the extensions are able to read from and also write to, and/or modify, each other's programmatic code, which allows extensions to readily share information with each other and, if properly written, work in concert with one another. Such an approach, however, raises a number of concerns. For instance, poorly written extensions (e.g., extensions containing bugs) could inadvertently modify another extension or interfere with its operation and thus, modify one or more of the other extension's functions, or disable the other extension all together. Such situations may also affect the performance and/or functionality of the browser. Another concern presented by running extensions in an open environment is that a malicious actor could distribute an extension that masquerades as a legitimate extension but is configured to modify one or more other extensions that are installed in the browser to perform malicious acts. Such malicious acts may include collecting personal information and the sending that information to the malicious actor.

In order to address the concerns presented by running extensions in an open environment, a browser may run each of its installed extensions in an isolated process, where the individual extensions do not have the ability to read and write each other's programmatic code. While such an approach addresses the concerns discussed above, it presents other concerns. For instance, such an approach prevents legitimate, well-formed extensions from working cooperatively with each other. Thus, one extension cannot leverage the features of another extension and would need to include code for implementing features that it may otherwise leverage from other extensions. Accordingly, the time and cost for developing an extension that will operate in an isolated process may increase as compared to an extension that operates in a well-behaved, open environment.

SUMMARY

According to one general aspect, a computer-implemented method may include implementing, in a web browser executing on a computing device, a first extension process. The first extension process may be functionally isolated from a second extension process that is implemented in the web browser. The method may also include presenting, by the first extension process, a public messaging interface. The method may further include receiving, by the first extension process via the public messaging interface, a messaging request from the second extension process, the messaging request including a unique extension ID of the second extension process. The method may also include determining, by the public messaging interface, whether to accept or reject the messaging request based on the first unique extension ID.

According to another general aspect, a computer-implemented method may include implementing, in a web browser executing on a computing device, a first extension process having a first unique extension identification (ID). The method may also include implementing, in the web browser, a second extension process having a second unique extension ID. In various embodiments, the first extension process and the second extension process may be functionally isolated from each other. The method may include presenting, by the first extension process to the second extension process, a first messaging interface. The method may further include presenting, by the second extension process to the first extension process, a second messaging interface. The method may also include sending, by the first extension process via the first messaging interface, a messaging request to the second extension process, the messaging request including the first unique extension ID and the second unique extension ID. The method may include receiving, by the second extension process via the second messaging interface, the messaging request. The method may also include determining, by the second messaging interface, whether to accept or reject the messaging request based on the first unique extension ID.

According to another general aspect, a recordable storage medium may have recorded and stored thereon instructions that, when executed by a computing device, cause the computing device to implement, in a web browser executing on the computing device, a first extension process, the first extension process being functionally isolated from a second extension process that is implemented in the browser. The instructions may cause the computing device to present, by the first extension process, a public messaging interface. The instructions may cause the computing device to receive, by the first extension process via the public messaging interface, a messaging request from the second extension process, the messaging request including a unique extension ID of the second extension process. The instructions may cause the computing device to determine, by the public messaging interface, whether to accept or reject the messaging request based on the first unique extension ID.

According to another general aspect, a recordable storage medium may have recorded and stored thereon instructions that, when executed by a computing device, cause the computing device to implement, in a web browser executing on a computing device, a first extension process having a first unique extension identification (ID). The instructions may cause the computing device to implement, in the web browser, a second extension process having a second unique extension ID, the first extension process and the second extension process being functionally isolated from each other. The instructions may cause the computing device to present, by the first extension process to the second extension process, a first messaging interface. The instructions may cause the computing device to present, by the second extension process to the first extension process, a second messaging interface. The instructions may cause the computing device to send, by the first extension process via the first messaging interface, a messaging request to the second extension process, the messaging request including the first unique extension ID and the second unique extension ID. The instructions may cause the computing device to receive, by the second extension process via the second messaging interface, the messaging request. The instructions may cause the computing device to determine, by the second messaging interface, whether to accept or reject the messaging request based on the first unique extension ID.

According to another general aspect, an apparatus may include a processor and a non-transitory recordable storage medium having instructions recorded thereon. In various embodiments, the apparatus may be configured, as result of executing the instructions, to implement, in a web browser executing on the apparatus, a first extension process, the first extension process being functionally isolated from a second extension process that is implemented in the browser. The apparatus may be configured to present, by the first extension process, a public messaging interface. The apparatus may be configured to receive, by the first extension process via the public messaging interface, a messaging request from the second extension process, the messaging request including a unique extension ID of the second extension process. The apparatus may be configured to determine, by the public messaging interface, whether to accept or reject the messaging request based on the first unique extension ID.

The details of one or more implementations are set forth in the accompanying drawings and the description below. Other features will be apparent from the description and drawings, and from the claims.

A system and/or method for message passing between browser extensions, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
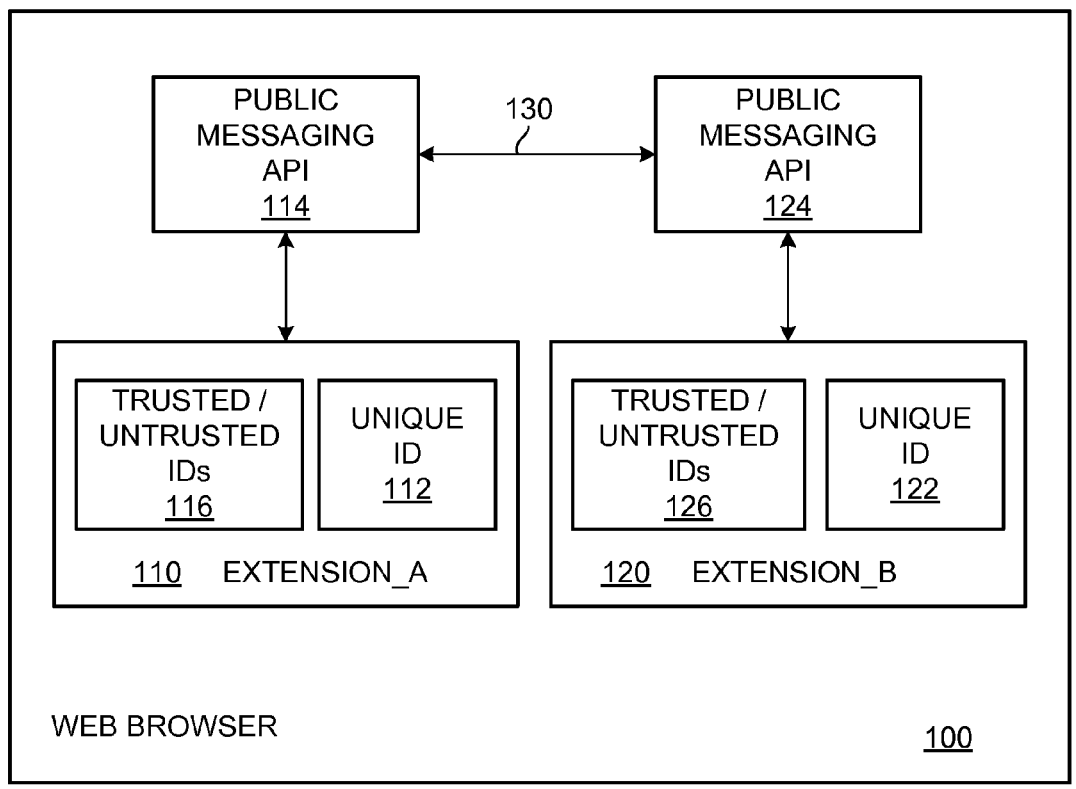
FIG. 1 is a block diagram illustrating a browser that implements inter-extension messaging in accordance with an example embodiment.

FIG. 1 is a block diagram illustrating a browser 100 that implements inter-extension messaging in accordance with an example embodiment. The browser 100 may be implemented in a computing device, such as the computing devices shown in FIG. 7 and described below. As shown in FIG. 1, the browser 100 may be used to implement a first extension process, Extension_A 110, and a second extension process, Extension_B 120. In the browser 100, the Extension_A 110 and the Extension_B 120 are implemented such that they are functionally isolated from each other, so as to reduce the risks associated with running extensions in an open execution environment, such as described above. In this example, each of the extension processes 110 and 120 includes a unique identifier (ID), 112 and 122, respectively.

The unique IDs 112 and 122 may be generated in a number of ways and used to provide security for inter-extension message passing, such as in the manners described. In an example embodiment, the unique IDs 112 and 122 may be generated using respective public/private encryption key pairs that are assigned or associated with the respective browser extensions. In one illustrative embodiment, such a public/private encryption key pair may include two 1024 bit encryption keys. In such an embodiment, the private encryption key may be kept relatively secret. For example, in various embodiments, the private encryption key may be shared or only known to both the browser extension developer and a proprietor of a web-based store (e.g., such as an e-commerce site) that distributes the browser extension, for example. Conversely, the public encryption key may be widely or publicly known.

In such an embodiment, one of the encryption keys (e.g., the public encryption key) may be used to produce a hash value that is substantially globally unique. In this context, a "cryptographic hash function" may include a deterministic procedure that takes an arbitrary block of data (e.g., the public encryption key, etc.) and returns a fixed-size bit string, the hash value, such that an accidental or intentional change to the data will change the hash value. In a preferred embodiment, the cryptographic hash function used to produce the hash value may include the Secure Hash Algorithm-Two-Fifty-Six (SHA-256) hash function developed by the United States' National Security Agency (NSA). In such an embodiment, the public/private encryption key pair may include a Rivest, Shamir and Adleman (RSA) public/private encryption key pair. It is understood that the above is merely one illustrative example to which the disclosed subject matter is not limited.

In one such embodiment, by generating the hash value from the public key, it may be possible for anyone who knows the public encryption key to generate the hash value. Therefore, the hash value may be widely known or derivable. Further, depending upon the hash function, the hash value may be sufficiently or substantially unique in that no two pieces of starting data (i.e., public keys, etc.) are statistically likely to produce the same resultant hash values. In such an embodiment, the hash value may be thought of as substantially globally unique.

In one embodiment, this hash value may be fairly large. While this may not be undesirable for authentication and signature purposes, as described above, the hash value may be too large to be desirable for identification purposes. However, as computing resources (e.g., memory, processing power, bandwidth, etc.) increase it is understood the desirable length of an identifier (ID) may also increase.

In such an embodiment, the GUID may be derived from the larger hash value. In one embodiment, the GUID may include just the first 128-bits or 32 characters, hex-encoded of the resultant hash value. It is understood that the above is merely one illustrative example to which the disclosed subject matter is not limited.

In some embodiments, this may result in a hex-encoded GUID. In various embodiments, it may be desirable to encode the GUID using another encoding scheme. In one specific illustrative embodiment, hex-encoding may be used for a variety of purposes on the computing device or within the context of the web browser. For example, Internet Protocol version 6 (IPv6) network addresses are generally 128-bit addresses encoded as 32 hex characters. Therefore, it is conceivable that in some embodiments, a web browser may confuse a 32 hex-character IPv6 address with a 32 hex characters browser extension GUID. This may be more likely in embodiments in which the GUID is employed in a URL, as described above. In such an embodiment, the GUID may be re-encoded via a scheme that would not be confused with an IPv6 network address (as a non-limiting example). However, it is understood that the motivations for selecting an encoding scheme for the GUID is not limited to this illustrative example.

In various embodiments, the GUID may be encoding using a scheme that does not include or employ numeric (i.e., the numbers 0-9) values. In one embodiment, this may include converting the hex characters 0-F to the alphabetic characters A-P. In such an embodiment, a simple 1-to-1 mapping may be used in which the hex character 0 becomes the alphabetic character A; the hex character 1 becomes the alphabetic character B; the hex character 3 becomes the alphabetic character C; and so forth. In such an embodiment, the hex-encoded value "01:01:23:51:CD:71:A6:14:8B:AF:D7:65:02:31:BA:35" may become the alphabetic encoded value "ab:ab:cd:fb:mn:hb:kg:be:il:kp:nh:gf:ac:db:lk:df". In various embodiments, this encoding scheme may be referred to as "mpdecimal". It is understood that the above is merely one illustrative example to which the disclosed subject matter is not limited.

Using the unique IDs 112 and 122, the Extension_A 110 and the Extension_B 120 may implement a messaging protocol that allows them operate in concert with each other, while retaining their functional isolation and thus avoiding the threats associated with operating in an open execution environment.

To provide for implementing secure, inter-extension messaging passing in the browser 100, each of the extension processes 110 and 120 presents a public messaging application programming interface (API), 114 and 124, respectively, the other extension process. The public messaging APIs 114 and 124 may be configured to securely pass messages between each other using the unique IDs 112 and 114 as a filtering mechanism. While only two extension processes, 110 and 120, are shown and described herein, it will be appreciated that additional extensions may be implemented in the browser 100 and the techniques described herein would apply equally to those additional extensions.

In the browser 100, the public messaging APIs 114 and 124 may communicate messages to one another over a communication channel 130. Depending on the particular situation, the communication channel 130 may be configured to accomplish one-time message transactions (e.g., a single message, or a single message and a corresponding response) or the communication channel may be configured as an open messaging channel that may be used for communicating multiple messages and responses in an extended messaging conversation between the extension processes 110 and 120.

For purposes of this disclosure, the first message in a given messaging session (whether it is for a one-time message transaction or an extended messaging conversation) is referred to as a messaging request. It will be appreciated that different terms could be used to reference the first message in a one-time message transaction, as compared to the terms for a first message in an extended messaging conversation. It will also be appreciated that the implementation details of the first messages for different types for different types of messaging sessions may be different. For instance, the public messaging APIs may use different functions to indicate the type of messaging session that is desired. For example, a sendRequest function may be used to initiate a one-time messaging transaction, while a connectExternal function may be used to initiate an extended messaging conversation.

As indicated, the public messaging APIs may use the unique IDs 112 and 122 of the extension processes 110 and 120 as a filtering mechanism when implementing secure inter-extension message passing. As are described herein, messaging requests (initial messages in given messaging sessions) include the unique ID of the sending extension and also include the unique ID of the receiving extension. For example, if the Extension_A 110 wants to initiate a messaging session with the Extension_B 120 (e.g., a one-time messaging transaction or an extended messaging conversation), the Extension_A 110 may send a messaging request to the Extension_B 120 that includes the unique ID 112 as the sender's unique ID and the unique ID 122 as the receiver's unique ID, along with content of a message that the Extension_A 110 wishes to pass to the Extension_B 120.

As is discussed herein, each public messaging API 114 and 124 may comprise one or more event listener objects that are configured to identify the type of messaging requests that are being sent to their corresponding extension. For instance, if the public messaging API 114 sends a messaging request to the public messaging API 124 the messaging request, in this example, would include the unique ID of the Extension_B 120 as the receiver unique ID. The public messaging API 124, based on the receiver unique ID may then receive the messaging request.

The public messaging API 124 may then determine whether to accept or reject the messaging request by comparing the sender's unique extension ID with a list of trusted extension IDs 126 (or trusted extension IDs 116 for messages received at public messaging API 114). In such an approach, if it is determined that the sender's unique extension ID is present in the list of trusted extension IDs 126, the public messaging API 124, in this example, accepts the messaging request. However, if it is determined that the unique extension ID is not present in the list of trusted extension IDs 126, the public messaging API 124 may reject the messaging request.

In an alternative approach, the public messaging API 124 may determine whether to accept or reject the messaging request by comparing the sender's unique extension ID with a list of untrusted extension IDs 126 (or untrusted extension IDs 116 for messages received at public messaging API 114). In such an approach, if it is determined that the sender's unique extension ID is not present in the list of untrusted extension IDs 126, the public messaging API 124, in this example, accepts the messaging request. However, if it is determined that the unique extension ID 122 is present in the list of untrusted extension IDs 126, the public messaging API 124 rejects the messaging request.

In still another alternative approach, the sender's unique ID may be compared to both a list of trusted extension IDs and a list of untrusted extension IDs. If the user's unique ID is not in either list, the public messaging API 124 may communicate with the Extension_B 120 to determine whether or not to accept the messaging request (i.e., whether or not to allow the sending extension to pass messages to the Extension_B 120, via the public messaging API 124).

Determining whether to allow a sending extension to pass messages to the public messaging API 124 may be accomplished in a number of fashions. As an example, the Extension_B 120 may prompt the user with a query as to whether message passing access should be accepted or rejected. As another example, the Extension_B 120 may be configured to access a web resource that includes threat risk assessments for browser extensions. By passing the sending extension's unique ID to the web resource, the Extension_B 120 may be able to obtain an assessment of whether or not the sending extension is a security (e.g., contains malicious content) or a functional risk (e.g., is poorly formed) and determine whether or not to grant access based on that information, such as by comparing a received threat assessment to a threat tolerance level selected by a user. Of course, a determination whether or not to allow a sending extension to pass messages to the public messaging API 124 may be made in a number of appropriate fashions. In such an approach, once the determination whether to accept or reject the sender's messaging request is made, the Extension_B 120 may add the sender's unique ID to the appropriate list, e.g., the list of trusted IDs if a determination to accept the messaging request is made and the list of untrusted IDs if a determination to reject the messaging request is made.

Figure 2:
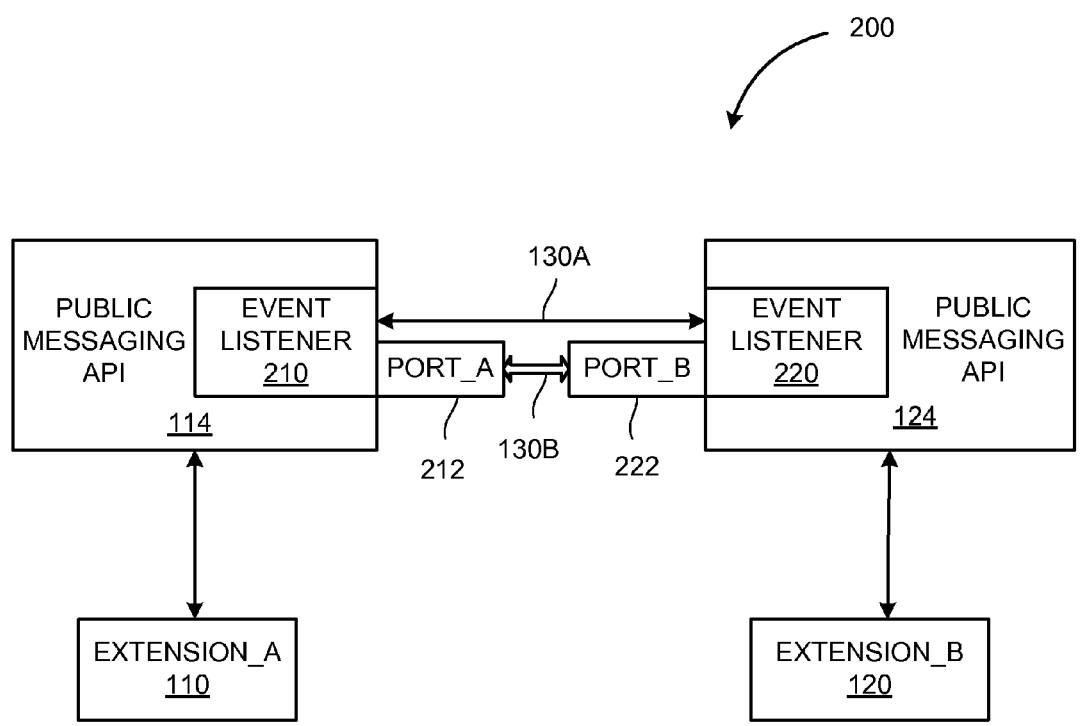
FIG. 2 is a block diagram illustrating an inter-extension messaging architecture in accordance with an example embodiment.

FIG. 2 is a block diagram illustrating an inter-extension messaging architecture 200 in accordance with an example embodiment. The messaging architecture 200 may be implemented in the browser 100 shown in FIG. 1 and includes like elements as those shown in FIG. 1 and described above. The like elements in FIG. 2 are designated with like reference numbers as their corresponding elements in FIG. 1. For purposes of brevity and clarity, the like elements of FIG. 2 from FIG. 1 are not described in detail again with respect to FIG. 2, except as they pertain to the additional elements of the inter-extension messaging architecture 200 shown in FIG. 2.

As shown in FIG. 2, the communication channel 130 of FIG. 1 is shown as two separate communication channels 130A and 130B. In the inter-extension messaging architecture 200, the channel 130A may be used for accomplishing one-time messaging transactions, and the channel 130B may be used for extended messaging conversations. As shown in FIG. 2, the communication channel 130B includes a first port object, Port_A, 212 that is virtually connected with the public messaging API 114 and also includes a port object, Port_B, 222 that is virtually connected with the public messaging API 124. If a messaging request to set up a messaging channel for an extended messaging conversation is granted in the inter-extension messaging architecture 200, a channel such as the channel 130B may be established. Once the channel 130B is established, messages and responses may be readily passed between the public messaging APIs 114 and 124 without the use of unique IDs. Once a given extended messaging conversation is completed, the communication channel 130B associated with that conversation may be closed. A method of such an approach is discussed in further detail below with respect to FIG. 6.

The inter-extension messaging architecture 200 also includes a first event listener object 210 that is included in the public messaging API 114 and a second event listener object 220 that is included in the public messaging API 124. The event listeners 210 and 220 may include multiple listener objects, one listener object (e.g., an onRequestExternal.addListener object) to listen for messaging requests for one-time messaging transactions and a second listener object (e.g., an onConnectExternal.addListener object) to listen for messaging requests for extended messaging conversations.

Figure 3A:
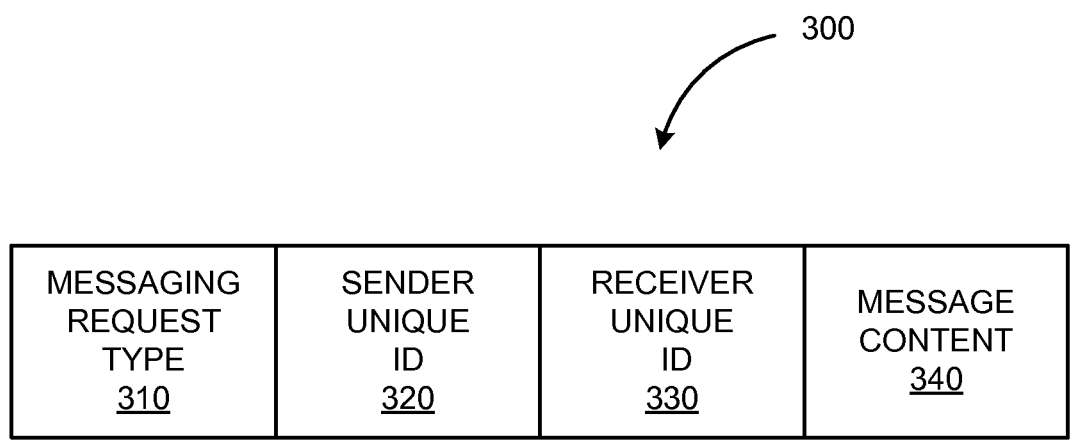
FIGS. 3A and 3B are diagrams illustrating inter-extension messages and responses in accordance with example embodiments.
Figure 3B:
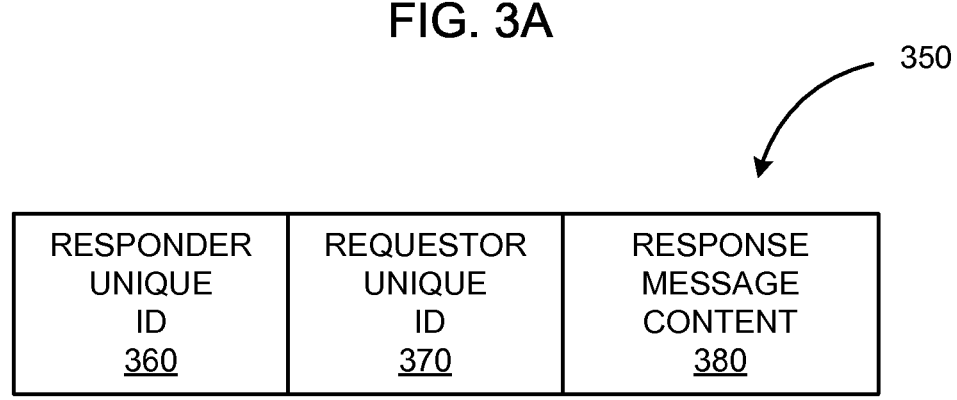

FIGS. 3A and 3B (collectively FIG. 3) are diagrams illustrating inter-extension message and response formats 300 and 350 in accordance with example embodiments. The format of the message 300 shown in FIG. 3A may be used for sending messaging requests for both one-time messaging transactions and to open messaging channels for extended messaging conversations, such as the channel 130B discussed above.

The messaging request message format 300 shown in FIG. 3A includes a messaging request type 310. The messaging request type 310 may include an object that indicates the type of messaging request (e.g., a one-time request or an extended conversation request) that is being made, such as those discussed herein. The messaging request format 300 also includes a sender unique ID 320, which may include the unique ID of an extension that sent the messaging request message 300. Likewise, the messaging request format 300 also includes a receiver unique ID 330 that may include the unique ID of an extension that is an intended recipient of the messaging request 300. The messaging request 300 also includes a message content 340. The message content 340 may include a one-time message (including a request for a response) or, alternatively, may include a first message in an extended message conversation.

The message/response format 350 shown in FIG. 3B may be used to respond to a one-time messaging request. The message/response format 350 includes a responder unique ID 360 and a requestor unique ID 370. The responder unique ID 360, in this example, corresponds with the extension that received a messaging request 300 and the requestor unique IS corresponds with the extension that sent the messaging request 300. The message/response format 350 also includes a response/message content 380, which includes the substantive portion of a response to a one-time message request or, alternatively, messages in an extended messaging conversation once a messaging channel is open.

In some embodiments, the message/response format 350 may be used for an initial response to an extended messaging conversation. However, once a messaging communication channel, such as the channel 130B shown in FIG. 2, is established for an extended messaging conversation, associated extensions may communicate messages and responses use only the response message content 380.

Figure 4:
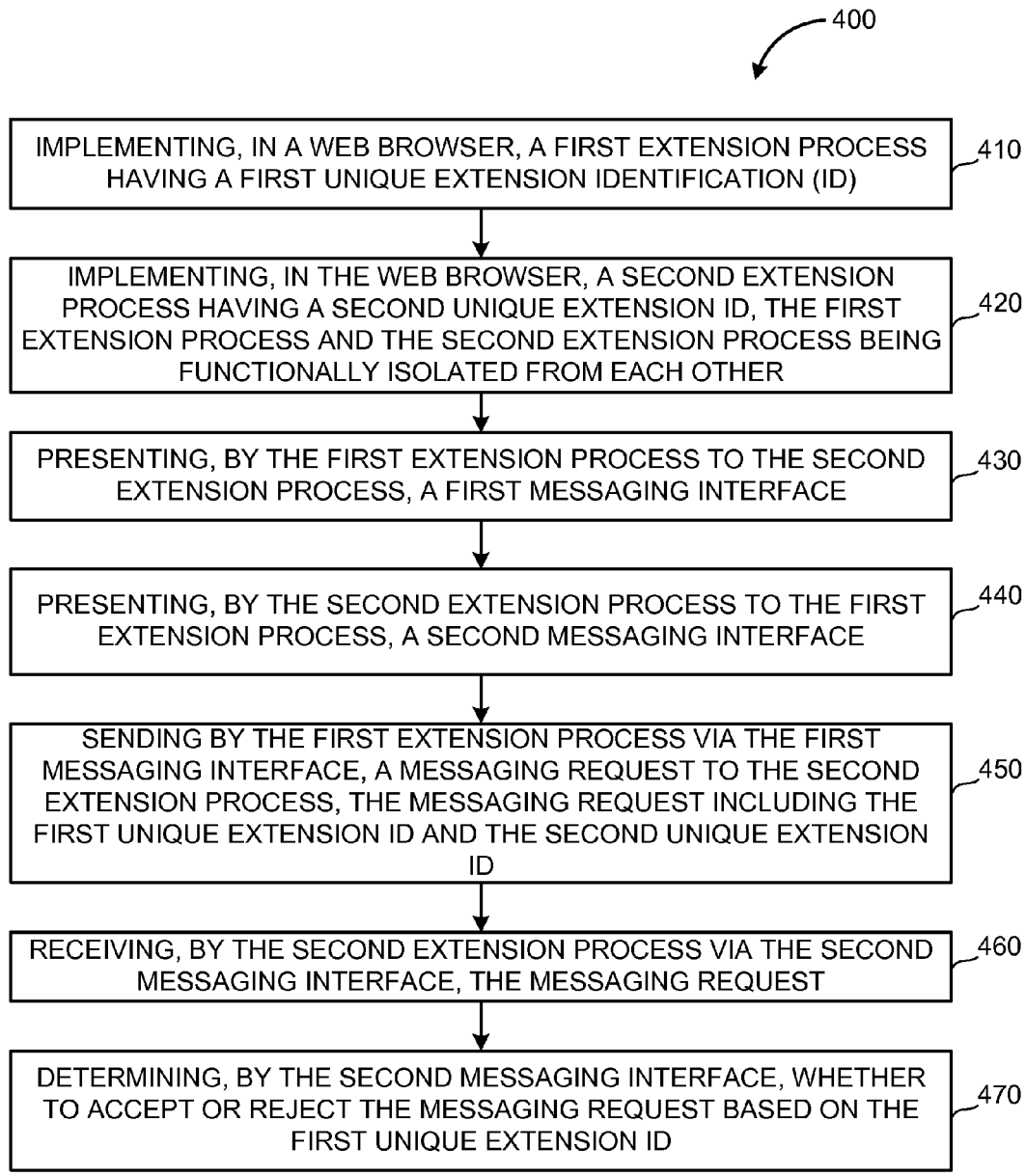
FIG. 4 is a flowchart illustrating a method for inter-extension messaging in accordance with an example embodiment.

FIG. 4 is a flowchart illustrating a method 400 for inter-extension messaging in accordance with an example embodiment. The method 400 may be implemented using the browser 100 shown in FIG. 1, the inter-extension messaging architecture 200 shown in FIG. 2, and the messaging and response formats 300 and 350 shown in FIG. 3. Accordingly, for purposes of illustration, FIG. 4 will be described with further reference to FIGS. 1-3, as appropriate. It will be appreciated, however, that other configurations and techniques may be used to implement the method 400.

The method 400 includes, at block 400 implementing, in a web browser (e.g., the web browser 100) executing on a computing device, a first extension process (e.g., the extension process Extension_A 110) having a first unique extension identification (ID) (e.g., the unique ID 112). The method 400 further includes, at block 410 implementing, in the web browser 100, a second extension process (e.g., the extension process 120) having a second unique extension ID (e.g., the unique ID 122). As indicated at block 420, in the method 400, the first extension process (Extension_A) 110 and the second extension process (Extension_B) 120 are functionally isolated from each other, such as was discussed above.

At block 430, the method 400 includes presenting, by the first extension process 110 to the second extension process 120, a first messaging interface (e.g., the public message API 114). At block 440, the method 400 includes presenting, by the second extension process 120 to the first extension process 110, a second messaging interface (e.g., the public messaging API 124).

The method 400, at block 450, includes sending, by the first extension process 110 via the first messaging interface 114, a messaging request (e.g., the messaging request 300) to the second extension process 120. As shown at block 450 and in FIG. 3A, the messaging request 300 may include the first unique extension ID (e.g., the sender unique ID 320) and the second unique extension ID (e.g., the receiver unique ID 330). In this example, the sender unique ID 320 is the unique ID 112 of the first extension process 110 and the receiver unique ID 330 is the unique ID 122 of the second extension process 120.

At block 460, the method 400 includes receiving, by the second extension process 120 via the second messaging interface 124, the messaging request 300. At block 470, the method 400 includes determining, by the second messaging interface 124, whether to accept or reject the messaging request 300 based on the first (sender) unique extension ID 320. As was discussed above, the second messaging interface 124, at block 470, may determine whether to accept or reject the messaging request 300 based on a comparison of the sender unique ID 320 with a list of trusted and/or untrusted extension IDs (e.g., the trusted/untrusted IDs 126).

If, at block 470, the sender unique ID 320 matches one of the trusted IDs 126 and/or does not match any of the untrusted IDs 126, the second messaging interface 124, in this example, would accept the messaging request. If, at block 470, the sender unique ID 320 does not match any of the trusted IDs 126 and/or matches one of the untrusted IDs 126, the second messaging interface 124, in this example, would reject the messaging request 300.

Figure 5A:
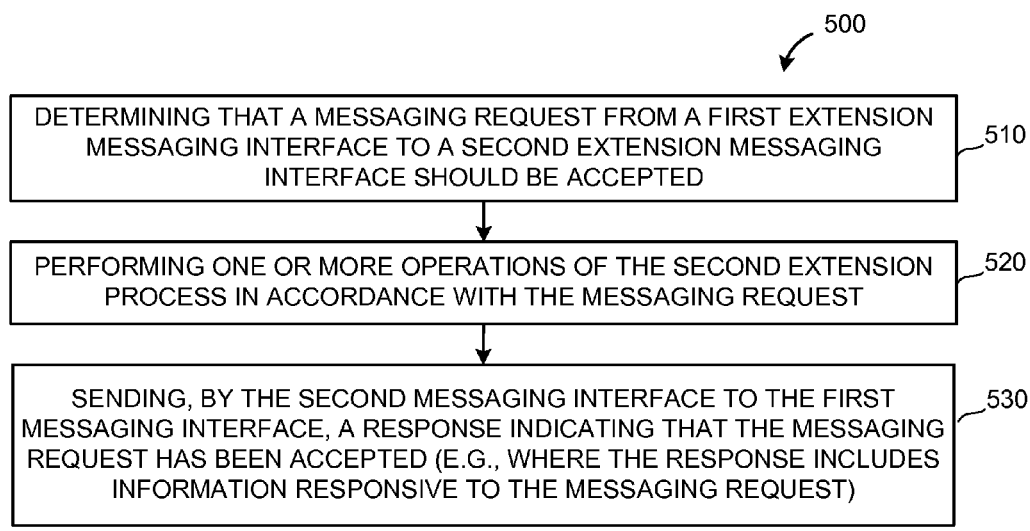
FIGS. 5A and 5B are flowcharts illustrating methods for inter-extension messaging in accordance with example embodiments.
Figure 5B:
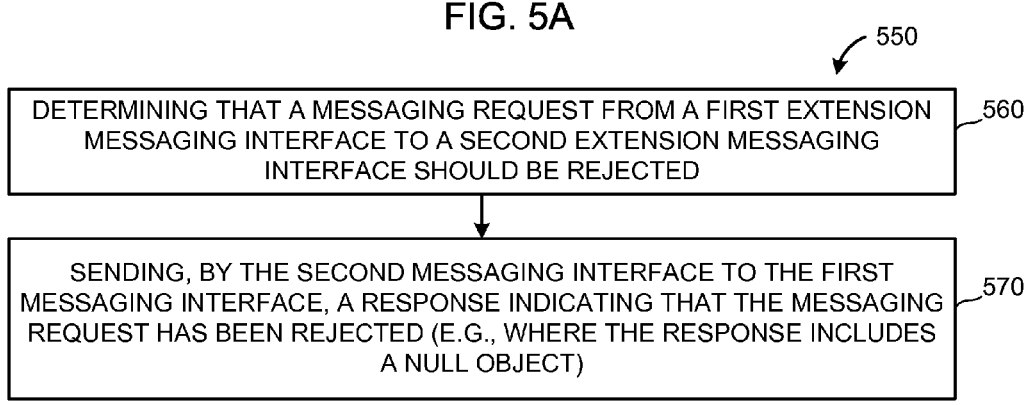
Figure 6:
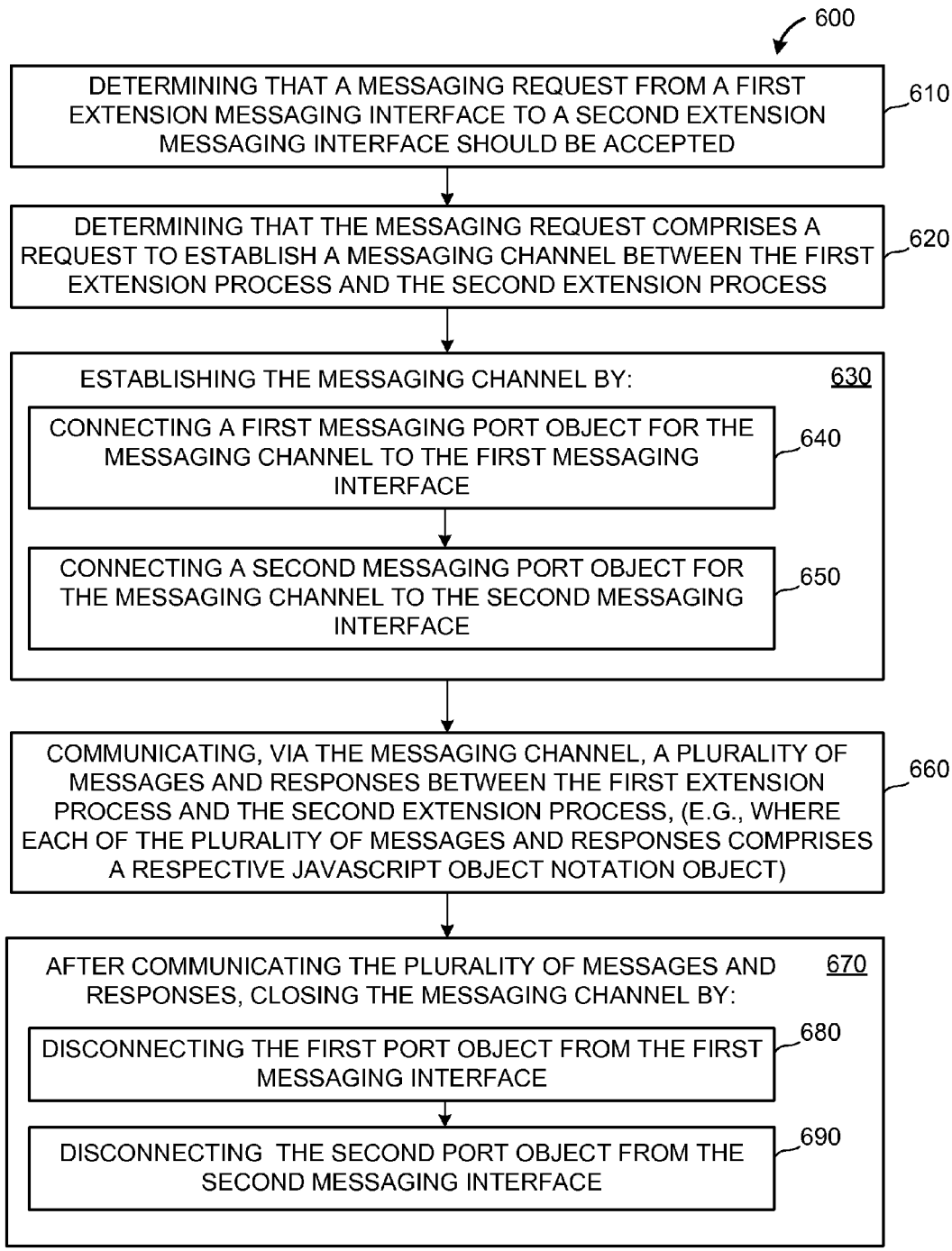
FIG. 6 is a flowchart illustrating a method for inter-extension messaging in accordance with an example embodiment.

In the method 400, how the messaging request 300 is handled by the second extension process 120 and its public messaging API 124 may depend on, in addition to the determination at block 470, the type of request 310 that is included in the messaging request 300. For instance, as discussed above, the messaging request type 310 of the messaging request 300 may indicate that the messaging request 300 is a one-time messaging request, which may or may not require a substantive response from the Extension_B 120. Alternatively, the messaging request 300 may indicate that the messaging request 300 is a request to open a messaging channel (e.g., the messaging channel 130B) to facilitate a messaging conversation between the Extension_A 110 and the Extension_B 120. FIGS. 5A, 5B and 6 illustrate example methods for handling the messaging request 300 for the different messaging request types, if accepted by the public messaging API 124, and for handling the messaging request 300 if it is rejected.

FIGS. 5A and 5B (collectively "FIG. 5") are flowcharts illustrating methods 500 and 550 for inter-extension messaging in accordance with example embodiments. As indicated above, the methods 500 and 550 may be implemented in conjunction with the method 400 and, for purposes of illustration, will be described as such. As with the method 400, the methods 500 and 550 may be implemented using the browser 100 shown in FIG. 1, the inter-extension messaging architecture 200 shown in FIG. 2, and the messaging and response formats 300 and 350 shown in FIG. 3. Accordingly, for purposes of illustration, FIG. 5 will be described with further reference to FIGS. 1-3, as appropriate, and the reference numbers from FIGS. 1-3 that were used in the discussion of FIG. 4 will also be used in the discussion of FIG. 5. It will be appreciated, however, that other configurations and techniques may be used to implement the method 500.

Referring to FIG. 5A, the method 500 may be used for handling the messaging request 300 when it is determined by the second messaging interface 124 that the messaging request 300 is to be accepted, such as at block 470 in FIG. 1, and as shown at block 510 in FIG. 5A. For purposes of the method 500, the messaging request 300 may comprise either a one-time messaging request or a request to open a messaging channel between the Extension_A 110 and the Extension_B 120, such as by using the approaches descried herein.

At block 520, the method 500 includes performing one or more operations of the Extension_B in accordance with the messaging request 300. For example, if the messaging request 300 is a one-time messaging request that includes a notification to the Extension_B 120 from the Extension_A 110, the operations performed at block 520 may include operations for processing that notification. Alternatively, if the messaging request 300 specifies that a substantive response is expected, the operations performed at block 520 may include operations for obtaining information to include in a response to the messaging request 300.

At block 530, the method 500 includes sending, by the second messaging interface 124 to the first messaging interface 114, a response (e.g., the message 350) indicating that the messaging request 300 has been accepted. If the messaging request 300 does not specify that a substantive response is expected, the response 350 sent at block 530 may comprise an acknowledgment to the messaging request 300. This acknowledgment notifies the first messaging interface 114 that the messaging request 300 has been received and/or accepted by the second messaging interface 124. If the messaging request 300 does specify that a substantive response is expected, the response may then include information gathered at block 520, such as was discussed above. In response to receiving the response 350 (whether an acknowledgment response or a substantive response), the first messaging interface 114 may clear a request associated with its transmission of the messaging request 300, so as to indicate that the one-time messaging transaction is complete.

Referring to FIG. 5B, the method 550 may be used for handling the messaging request 300 when it is determined by the second messaging interface 124 that the messaging request 300 is not to be accepted, such as at block 470 in FIG. 4, and as shown at block 560 in FIG. 5B. For purposes of the method 550, the messaging request 300 may comprise either a one-time messaging request or a request to open a messaging channel between the Extension_A 110 and the Extension_B 120. However, for the example method 550, because the second messaging interface 124 has determined that the messaging request 300 is to be rejected, the type of request is effectively moot.

At block 570, the method 550 includes sending, by the second messaging interface 124 to the first messaging interface 112, a response 350 indicating that the messaging request has been rejected. As described herein, at block 570, the response message content 380 of the response 350 may comprise a null object, which may indicate to the first messaging interface 114 that the second messaging interface has rejected the messaging request 300. In response to receiving, at block 570, the response 350 that includes a null object as the response message content 380, the first messaging interface 114 may clear a request associated with its transmission of the messaging request 300, so as to indicate that the messaging transaction is complete.

FIG. 6 is a flowchart illustrating a method 600 for inter-extension messaging in accordance with an example embodiment. As indicated above, the method 600 may be implemented in conjunction with the method 400 and, for purposes of illustration, will be described as such. As with the methods 400, 500 and 550, the method 600 may be implemented using the browser 100 shown in FIG. 1, the inter-extension messaging architecture 200 shown in FIG. 2, and the messaging and response formats 300 and 350 shown in FIG. 3. Accordingly, for purposes of illustration, FIG. 5 will be described with further reference to FIGS. 1-3, as appropriate, and the reference numbers from FIGS. 1-3 that were used in the discussion of FIGS. 4 and 5 will also be used in the discussion of FIG. 6. It will be appreciated, however, that other configurations and techniques may be used to implement the method 600.

The method 600 may be used for handling the messaging request 300 when it is determined by the second messaging interface 124 that the messaging request 300 is to be accepted, such as shown at block 470 in FIG. 4, and as shown at block 610 in FIG. 6. At block 620, the method 600 includes determining that the messaging request 300 comprises a request to open the messaging channel 130B (including the port objects 212 and 222) between the first messaging interface 114 and the second messaging interface 124.

At block 630, the method 600 includes establishing the messaging channel 130B, which includes, at block 640, connecting a first messaging port object (e.g., the Port_A 212) for the messaging channel 130B to the first messaging interface 114, which, as discussed above, for this example, is a virtual connection. Establishing the messaging channel at block 630 further includes, at block 650, connecting (e.g., virtually) a second messaging port object (e.g., the Port_B 222) for the messaging channel 130B to the second messaging interface 124.

At block 660, the method 600 includes communicating, via the messaging channel 130B, a plurality of messages/responses 350 between the first extension process 110 and the second extension process 120. The messages/responses 350 communicated at block 660 may each comprise a respective JAVASCRIPT Object Notation (JSON) object. Also, the messages/responses 350 communicated at block 660 may omit the ID fields 360 and 370, which, depending on the particular embodiment, may not be needed for messages communicated over the messaging channel 130B, once established at block 630.

The method 600 further includes, at block 670, after communicating the plurality of messages/response, closing the messaging channel 130B. Closing the messaging channel 130B at block 670 includes, at block 680, disconnecting (e.g., virtually) the first Port_A 212 from the first messaging interface 114. Closing the message channel 130B at block 670 further includes, at block 690, disconnecting (e.g., virtually) the second Port_B 222 from the second messaging interface 124. In an example embodiment, closing the messaging channel 130B at block 670 may be performed in response to a Port.onDisconnect event that is triggered by either the first messaging interface 110 or the second messaging interface 120 calling a Port.disconnect object.

Figure 7:
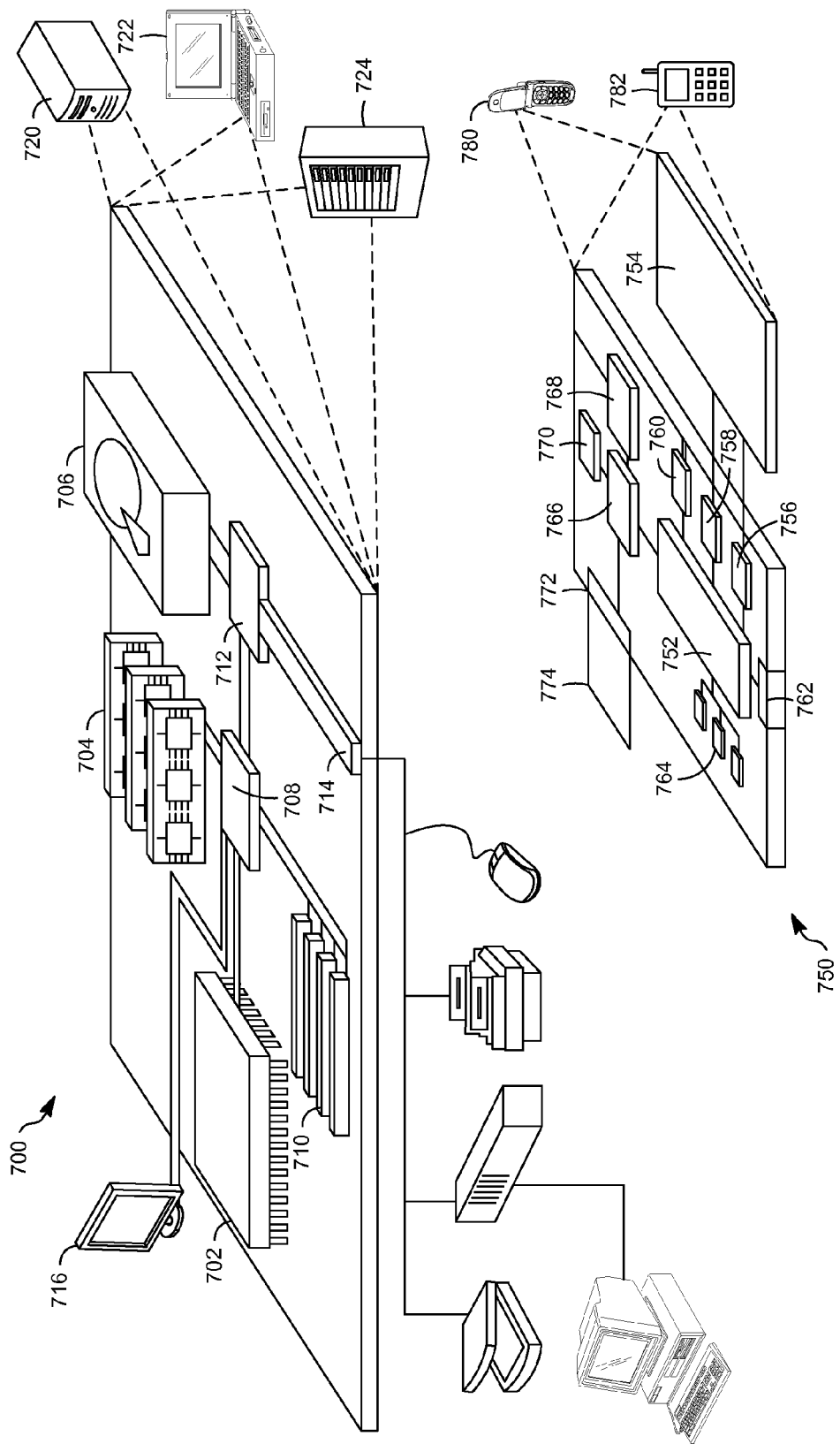
FIG. 7 is a diagram illustrating a computing device and a mobile computing device that can be used to implement the techniques described herein in accordance with an example embodiment.

FIG. 7 is a diagram that shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   implementing, in a web browser executing on a computing device, a first extension process, the first extension process being functionally isolated from a second extension process that is implemented in the web browser, the first extension process including at least one of a list of extension IDs trusted by the first extension process and a list of extension IDs untrusted by the first extension process;
   presenting, by the first extension process, a first public messaging interface;
   receiving, by the first extension process at the first public messaging interface, a messaging request from a second public messaging interface of the second extension process, the second public messaging interface being different than the first public messaging interface and including at least one of a list of extension IDs trusted by the second extension process and a list of extension IDs untrusted by the second extension process, the messaging request including a unique extension ID of the second extension process; and
   determining, by the first public messaging interface, whether to accept or reject the messaging request, the determining including:
      comparing the unique extension ID with the at least one of the list of extension IDs trusted by the first extension process and the list of extension IDs untrusted by the first extension process;
      in the event the unique extension ID matches an extension ID in the at least one of the list of extension IDs trusted by the first extension process and the list of extension IDs untrusted by the first extension process, respectively accepting or rejecting the messaging request; and
      in the event the unique extension ID does not match an extension ID in the at least one of the list of extension IDs trusted by the first extension process and the list of extension IDs untrusted by the first extension process:
         sending a request for a threat assessment for the second extension process to a web-based resource, the request including the unique extension ID;
         receiving, from the web-based based resource in response to the request, the threat assessment for the second extension process; and
         accepting or rejecting the messaging request based on the threat assessment.

2. The computer-implemented method of claim 1, wherein if the first public messaging interface accepts the messaging request, the computer-implemented method further comprises:

performing one or more operations of the first extension process in accordance with the messaging request; and sending, by the first public messaging interface to the second extension process, a response indicating that the messaging request has been accepted.

3. The computer-implemented method of claim 1, wherein if the first public messaging interface rejects the messaging request, the computer-implemented method further comprises sending, by the first public messaging interface to the second extension process, a response indicating that the messaging request has been rejected.

4. The computer-implemented method of claim 3, wherein the response comprises a null object.

5. The computer-implemented method of claim 1, wherein the first public messaging interface comprises an event listener configured to receive messaging requests for the first extension process and determine whether received messaging requests are one-time messaging requests or ongoing messaging requests.

6. The computer-implemented method of claim 1, wherein the messaging request includes a request for information from the first extension process.

7. The computer-implemented method of claim 1, wherein the messaging request further includes a messaging request type indicator that identifies the messaging request as one of a one-time messaging request and an ongoing messaging request, in the event the messaging request type indicator identifies the messaging request as an ongoing messaging request, the computer-implemented method further includes:

virtually connecting a first port object with the first public messaging interface;

virtually connecting a second port object with the second public messaging interface; and passing a plurality of messages and corresponding responses between the first extension process and the second extension process via the first port object and the second port object.

8. The computer-implemented method of claim 1, wherein the messaging request comprises a JAVASCRIPT Object Notation object.

9. The computer-implemented method of claim 1, wherein the threat assessment includes a security threat assessment indicating whether or not the second extension process includes malicious content.

10. The computer-implemented method of claim 1, wherein the threat assessment includes a functional threat assessment indicating whether or not the second extension process is poorly formed.

11. The computer-implemented method of claim 1, wherein accepting or rejecting the messaging request based on the threat assessment includes comparing the threat assessment with a threat tolerance level of the first extension process.

12. A non-transitory recordable storage medium having recorded and stored thereon instructions that, when executed by a computing device, cause the implement, in a web browser executing on the computing device, a first extension process including at least one of a list of extension IDs trusted by the first extension process and a list of extension IDs untrusted by the first extension process, the first extension process being functionally isolated from a second extension process that is implemented in the browser, the second extension process including at least one of a list of extension IDs trusted by the second extension process and a list of extension IDs untrusted by the second extension process;

present, by the first extension process, a first public messaging interface;

receive, by the first extension process at the first public messaging interface, a messaging request from a second public messaging interface of the second extension process, the second public messaging interface being different than the first public messaging interface, the messaging request including a unique extension ID of the second extension process; and determine, by the first public messaging interface, whether to accept or reject the messaging request, the determining including:

comparing the unique extension ID with the at least one of the list of extension IDs trusted by the first extension process and the list of extension IDs untrusted by the first extension process;

in the event the unique extension ID matches an extension ID in the at least one of the list of extension IDs trusted by the first extension process and the list of extension IDs untrusted by the first extension process, respectively accepting or rejecting the messaging request; and in the event the unique extension ID does not match an extension ID in the at least one of the list of extension IDs trusted by the first extension process and the list of extension IDs untrusted by the first extension process:

sending a request for a threat assessment for the second extension process to a web-based resource, the request including the unique extension ID;

receiving, from the web-based based resource in response to the request, the threat assessment for the second extension process; and accepting or rejecting the messaging request based on the threat assessment.

* * * * *

UNITED STATES PATENT AND TRADEMARK OFFICE
CERTIFICATE OF CORRECTION

PATENT NO.         : 9,477,534 B2
APPLICATION NO.    : 13/110893
DATED              : October 25, 2016
INVENTOR(S)        : Perry et al.

It is certified that error appears in the above-identified patent and that said Letters Patent is hereby corrected as shown below:

In the Claims

In Column 16, Line 59, Claim 1, delete "web-based based" and insert -- web-based --, therefor.

In Column 18, Line 6, Claim 12, delete "cause the" and insert -- cause the computing device to: --, therefor.

In Column 18, Line 47, Claim 12, delete "web-based based" and insert -- web-based --, therefor.

Signed and Sealed this
Fourteenth Day of March, 2017

Michelle K. Lee
*Director of the United States Patent and Trademark Office*